United States Patent Office 2,761,864
Patented Sept. 4, 1956

2,761,864

STABILIZATION OF HETEROCYCLIC NITROGEN COMPOUNDS

Robert E. Reusser, Bartlesville, and Anton M. Schnitzer, Dewey, Okla., assignors to Phillips Petroleum Company, a corporation of Delaware No Drawing. Application January 17, 1955, Serial No. 482,382

22 Claims. (Cl. 260—290)

This invention relates to the stabilization of vinyl-substituted heterocyclic compounds having a hetero nitrogen atom. In a further aspect, this invention relates to the stabilization of vinylpyridine compounds.

One of the major difficulties encountered in the manufacture of vinylpyridines and other vinyl-substituted heterocyclic nitrogen compounds is the tendency of these vinyl compounds to polymerize at ambient temperatures and, particularly, when subjected to elevated temperatures. This is an important problem because these vinyl compounds are used as monomers in polymerization reactions and the presence of soluble and/or insoluble polymers in the vinylpyridine monomers can prevent their use for this purpose. Obviously, the problem reaches its peak when such vinyl compounds are processed in the presence of heat, for example, in the distillation of these compounds.

Vinylpyridines can be prepared by the dehydrogenation of a corresponding alkylpyridine by a method disclosed in the copending application of John E. Mahan, Serial No. 244,469, filed August 30, 1951, for "The Preparation of 2-Methyl-5-Vinylpyridine From 2-Methyl-5-Ethylpyridine." The effluent from this dehydrogenation reaction is separated in a combined steam and vacuum fractional distillation and this separation has been found to be very difficult, not only due to the proximity of the boiling points of the major components, but also due to the tendency of the 2-methyl-5-vinylpyridine to polymerize. The effluent is subjected to heat in the range of 180° to 220° F. during this steam and vacuum distillation and operation of this distillation step can become impossible because of the formation of polymers unless a suitable stabilizing agent is used.

Polymers are also formed at ambient temperatures when the vinylpyridine compounds are stored and transported unless an effective stabilizing agent is added.

It is an object of this invention, therefore, to provide a method for inhibiting the polymerization of vinyl-substituted heterocyclic compounds having a hetero nitrogen atom. It is a further object to provide a method for inhibiting the formation of both soluble and insoluble polymers in said vinyl-substituted heterocyclic compounds. It is a still further object to provide a method for preventing polymerization under conditions of fractional distillation of vinylpyridines. Other and further objects will be apparent from the following description.

We have discovered that the foregoing objects are attained by adding to vinyl-substituted heterocyclic compounds having a hetero nitrogen atom a polymerization inhibiting amount of certain azine dyes. The azine dyes which are effective inhibitors in accordance with this invention are, broadly, the amino-substituted phenylphenazinium chlorides represented by the general formula

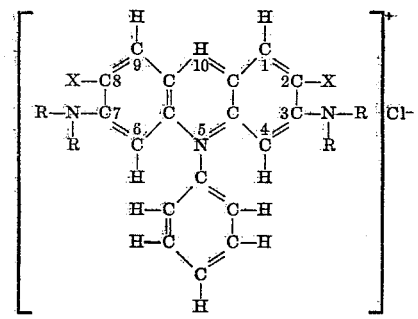

wherein R can be a hydrogen, phenyl, or alkyl radical, said alkyl radical having up to and including 5 carbon atoms, and X can be a hydrogen, phenyl or said alkyl radical or

wherein R is defined as stated above.

The azine dyes to which this invention relates can also be defined as being selected from the group consisting of diamino - phenylphenazinium chlorides, triamino-phenylphenazinium chlorides, tetraamino - phenylphenazinium chlorides and phenyl- and alkyl-substituted derivatives thereof, wherein said alkyl substituents can have up to and including 5 carbon atoms.

Specific working examples of these azine dyes which can be used as inhibitors in accordance with our invention are 5-phenyl-3,7-diaminophenazinium chloride(phenosafranin); 5-phenyl-3-amino-7-dimethylaminophenazinium chloride (methylene violet); 5-phenyl-2,8-dimethyl-3,7-diaminophenazinium chloride (safranin); 5-phenyl-2-phenylamino - 3,7 - di(phenylamino)phenazinium chloride (induline 3B); 5-phenyl-2,3,7,8-tetra(phenylamino)phenazinium chloride (induline 6B); 5-phenyl-3,7-di(diethylamino)phenazinium chloride (amethyst violet); 5-phenyl-3 - dimethylamino-7-amino-8-methylphenazinium chloride (Rhodulin violet B); 5-phenyl-3-phenylamino-7-amino-8-methylphenazinium chloride (Methylene heliotrope); 5-phenyl-2,8-dimethyl-3-methylamino-7-ethylaminophenazinium chloride (Brilliant rhodulin red); 5-phenyl-2,3-di-(phenylamino)-7-aminophenazinium chloride (Indamin blue B); 5-phenyl-2-ethyl-3,7-diamino-8-propylphenazinium chloride; 5-phenyl-2(N-phenyl-N-propylamino)-3(N'-ethyl-N'-pentylamino)-7-amino-8-butylaminophenazinium chloride; 5-phenyl-2,8-dipentyl - 3,7 - diaminophenazinium chloride; 5-phenyl - 2 - (N-phenyl-N-methyl)-3,7,8-tri(diphenylamino)phenazinium chloride; 5-phenyl-2,8-dibutyl-3,7-diaminophenazinium chloride; 5-phenyl-2,3,7,8-tetra-(dipentylamino) phenazinium chloride; and the like. Structural formulas and the naming system followed herein for these azine dyes can be found in "Encyclopedia of Chemical Technology" by Raymond E. Kirk and Donald F. Othmer, volume 2, pages 214–223, published by The Interscience Encyclopedia, Inc., New York (1948) and in "Farbstofftabellen" von Gustav Schultz, siebente auflage, neu bearbeitet und erweitert von Dr. Ludwig Lehmann, Leipsiz, Akademische Verlagsgesellschaft, M. B. H. (1931), lithographed by Edwards Brothers, Inc., Ann Arbor, Michigan (1945).

As has been indicated above, these azine dyes are effective to inhibit the formation of both soluble and insoluble polymers in vinyl-substituted heterocyclic compounds having a hetero nitrogen atom. The insoluble polymer is also commonly known as "popcorn polymer" and is an insoluble, hard, porous and opaque material. Popcorn polymer is aptly named because it resembles "popcorn" in appearance.

We wish to point out that we intend that the terms "stabilizer," "inhibitor" or "inhibiting agent," used herein, shall have essentially the same meaning and that they are used for essentially the same purpose, which is to designate the substances disclosed herein which prevent polymerization of the vinyl-substituted heterocyclic nitrogen compounds. It is not intended that these terms necessarily shall denote a mechanism by which this stabilizing action is accomplished.

One group of polymerizable vinyl-substituted heterocyclic compounds containing a hetero nitrogen atom which can be stabilized in accordance with our invention is the mono- and divinylpyridines, with the vinyl radical being present in any of the several positions in the pyridine nucleus. Alkyl radicals can be present on the ring, or on the alpha carbon atom of the vinyl radical, but the number of carbon atoms in the combined alkyl radicals should generally not be greater than 12. These alkyl radicals are preferably methyl and ethyl radicals. Substituents attached to carbon atoms in the ring can be selected from the group consisting of hydrogen, alkyl, vinyl and isopropenyl (alpha-methylvinyl) radicals; at least one, and not more than two, of said radicals being vinyl or alpha-methylvinyl with the total number of carbon atoms in the alkyl radicals being not greater than 12. Examples of such compounds are 2-vinylpyridine, 3-vinylpyridine, 4-vinylpyridine, 2,5-divinylpyridine, 2-methyl-5-vinylpyridine, 2-vinyl-5-ethylpyridine, 2,3,4-trimethyl-5-vinylpyridine, 3,4,5,6-tetramethyl-2-vinylpyridine, 3-ethyl-5-vinylpyridine, 2,6-diethyl-4-vinylpyridine, 2-isopropyl-4-nonyl-5-vinylpyridine, 2-methyl-5-undecyl-4-vinylpyridine, 3-dodecyl-2,4-divinylpyridine, 2,3-dimethyl-5,6-dipentyl - 4 - vinylpyridine, 2 - methyl - 5 - (alpha - methylvinyl)pyridine, 2,5-di(alpha-methylvinyl)pyridine, and the like.

Other polymerizable heterocyclic compounds containing a hetero nitrogen atom included within the scope of this invention are those vinyl- and alpha-methylvinyl-substituted heterocyclic nitrogen compounds in which the ring structure is unsaturated, partially saturated and completely saturated. Examples include vinyl- and alpha-methylvinyl-substituted quinolines, isoquinolines, piperidines (hexahydropyridines), pyrroles, pyrrolidines, pyrrolidones, alkyl derivatives of the foregoing compounds, dihydro and tetrahydropyridines, partially hydrogenated quinolines and isoquinolines, and pyrrolines (dihydropyrroles). Examples of such compounds are 2-vinylquinoline, 8-ethyl-2-vinylquinoline, 4-hexyl-5-vinylquinoline, 1-vinylisoquinoline, 5 - methyl - 1 - isopropenylisoquinoline, 1,8 - divinylisoquinoline, vinylpyrrolidone, vinylpyrrole, vinylpiperidine and vinylpyrrolidine, and the like. Normally, the vinyl substituent will be attached to a ring carbon atom. However, in compounds wherein the ring nitrogen atom is a secondary nitrogen atom, the vinyl group can instead be attached to this ring nitrogen atom, for example, N-vinylcarbazole and N-vinylpyrrolidone. The process of this invention is particularly applicable to organic or hydrocarbon mixtures containing substantial proportions of a vinylpyridine compound, i. e., that amount which causes difficulties due to its polymerization, e. g., over 50 per cent. Examples of vinylpyridine compounds contained in such mixtures are 2-vinyl-4,6-dimethylpyridine, 2-methyl-4-vinylpyridine, 2-methyl-5-vinylpyridine, 5-ethyl-2-vinylpyridine, and 5-amyl-2-vinylpyridine.

In carrying out the invention, solution of the stabilizing agent in the vinylpyridine, or other heterocyclic compound containing a hetero nitrogen atom to be stabilized, can be accomplished in any suitable manner, such as by agitating or stirring the mixture containing the stabilizing agent, or merely by allowing the mixture to stand. Ultimately, the decision on what concentration of the stabilizing agent to use will depend on variable factors, such as the temperature and duration of time at a given temperature at which the heterocyclic compound containing a hetero nitrogen atom will be maintained when inhibition of polymer formation is desired, and economic considerations. In practice, a range of concentration from about 0.05 per cent to 2.0 per cent, or more, by weight of the azine compounds disclosed herein will be employed, preferably from 0.1 per cent to 1.0 per cent, all percentages being based on the weight of the heterocyclic compound containing a hetero nitrogen atom to be stabilized. Furthermore, the amount will depend on which particular heterocyclic compound containing a hetero nitrogen atom is concerned.

EXAMPLE I

Certain azine dyes within the scope of this invention were tested for their effectiveness as inhibitors of soluble polymer formation in 2-methyl-5-vinylpyridine. Samples of 2-methyl-5-vinylpyridine containing 5 weight per cent water were placed in vials and to each vial was added a small piece of steel and the inhibitor to be tested. The vials were then flushed with nitrogen and sealed tightly with screw-on tops. The vials were then placed in an oven and maintained at 185° F. for 16 hours, after which a weighed sample of the contents of each vial was evaporated under vacuum and over boiling water. The residue which remained, with allowance for the weight of inhibitor present, was considered to be soluble polymer. The results of these tests are given below in Table I.

Table I

| Inhibitor | Amount of Inhibitor (Weight Percent) | Amount of Soluble Polymer Formed (Weight Percent) |
| --- | --- | --- |
| Phenosafranin | 0.1 | 1.40 |
|  | 0.3 | 0.75 |
|  | 0.6 | 0.75 |
| Induline 3B | 0.1 | 1.60 |
|  | 0.3 | 0.90 |
|  | 0.6 | 0.72 |
| Safranin | 0.1 | 1.91 |
|  | 0.3 | 1.85 |
|  | 0.6 | 1.64 |
| Methylene Violet | 0.1 | 1.51 |
|  | 0.3 | 0.79 |
|  | 0.6 | 0.70 |
| Control | (No inhibitor) | 25 |

The data above in Table I show that the azine dyes are very effective to prevent the formation of soluble polymer in a vinyl-substituted heterocyclic nitrogen compound. This result is noteworthy because of the elevated temperature to which the samples were exposed and also because of the very small amount of polymer which was formed under these conditions. The control was simply a sample of 2-methyl-5-vinylpyridine which was treated in the way described for the other tests except that no inhibitor was added.

EXAMPLE II

The azine dyes were also tested for their effectiveness as inhibitors of soluble polymer formation by the following method. Weighed samples of 2-methyl-5-vinylpyridine containing 5 weight per cent water were refluxed for 16 hours at 185° F. under conditions of total reflux. A glass column, two feet long and three-quarters of an inch inside diameter was used. A small piece of wood having two inches of one-sixteenth inch diameter steel wire wrapped around it was used as a boiling chip. The pressure was adjusted to keep the temperature of the distillation at 185° F. and this pressure was calculated to be approximately 250 millimeters of mercury. The refluxing procedures were conducted in the presence of varying amounts of certain azine dyes and after distillation, the sample was evaporated under vacuum over boiling water. The residue which remained, with allowance for the weight of inhibitor present, was considered to be soluble polymer. The control which is noted at the bottom of the following Table II was a sample of 2-methyl-5-vinylpyridine which was subjected to the same conditions as those samples containing an inhibitor except that no inhibitor was used. The results of these tests are tabulated below in Table II.

Table II

| Inhibitor | Amount of Inhibitor Used (Weight Percent) | Amount of Soluble Polymer Formed (Weight Percent) |
| --- | --- | --- |
| Phenosafranin | 0.3 | 1.60 |
| Induline 3B | 0.3 | 1.07 |
| Safranin | 0.3 | 2.37 |
| Methylene Violet | 0.3 | 1.07 |
| Control | (No Inhibitor) | 25 |

The information above in Table II is particularly important because it demonstrates that these inhibitors are effective in distillation processes where the need for these inhibitors is of the greatest commercial importance.

EXAMPLE III

A group of tests was made using certain azine dyes to determine their effectiveness as inhibitors for the formation of insoluble or "popcorn" polymer in 2-methyl-5-vinylpyridine. Samples of the 2-methyl-5-vinylpyridine were prepared in vials as is described above in Example I, these samples containing about 5 per cent water. To each sample was added 0.3 weight per cent divinylbenzene and the stated amount of the inhibitor. The inhibitor was added to the sample after the sample has been allowed to stand for about 5 hours at 185° F. This five hour period of incubation produced a small seed of popcorn polymer after which the inhibitors were added to the sample. The control was prepared in the same way except that no inhibitor was placed in this sample. The vials were placed in an oven maintained at 185° F. and the results of these tests are noted below in Table III.

Table III

| Inhibitor | Amount of Inhibitor Used (Weight Percent) | Results |
| --- | --- | --- |
| Phenosafranin | 0.1 | No popcorn polymer in 20 days. |
| Methylene Violet | 0.1 | Do. |
| Induline 3B | 0.1 | Do. |
| Control | (No inhibitor) | 100 percent popcorn polymer in 8 hours. |

The data above in Table III shows that the azine dyes are remarkably effective to prevent the formation of insoluble or popcorn polymer even when the sample of the vinyl-substituted heterocyclic nitrogen compound was allowed to incubate at an elevated temperature and to form a seed of popcorn polymer before the inhibitor was added.

EXAMPLE IV

A further series of tests was made for ascertaining the effectiveness of the azine dyes as inhibitors for popcorn polymer formation in 2-methyl-5-vinylpyridine. The samples were prepared in vials as is described in Example I. Each sample of the 2 - methyl - 5 - vinylpyridine was "seeded," initially, by placing several seeds of popcorn polymer into each test vial at the beginning of the test. Each sample contained 5 weight per cent water and 0.3 weight per cent divinylbenzene. The control was prepared in the same way except that no inhibitor was added. The results of these tests are reported below in Table IV.

Table IV

| Inhibitor | Amount of Inhibitor Used (Weight Percent) | Results |
| --- | --- | --- |
| Phenosafranin | 0.1 | No popcorn polymer formed in 4 days; 30 percent popcorn polymer formed in 7 days. |
| Methylene Violet | 0.1 | No popcorn polymer formed in 2 days; 100 percent popcorn polymer formed in 4 days. |
| Induline 3B | 0.1 | No popcorn polymer formed in 2 days; 100 percent popcorn polymer in 4 days. |
| Control | (No inhibitor) | 100 percent popcorn polymer in 3 hours. |

The conditions of these tests are very severe for testing inhibitors of vinylpyridines. It will be noted that the temperature was elevated to that at which the 2-methyl-5-vinylpyridine is subjected in a distillation process and the seeding of the samples generally produces the conditions under which popcorn polymer is most easily formed. Even under these conditions, it will be noted that the azine dyes were remarkably effective to prevent the formation of insoluble polymer.

EXAMPLE V

Further tests of the azine dyes as polymerization inhibitors were made to determine their effectiveness under conditions of storage and/or transit of 2-methyl-5-vinylpyridine. In these tests, the vials, each containing a small piece of steel, were charged with flashed 2-methyl-5-vinylpyridine to which had been added 0.1 weight per cent of the inhibitor. 35 per cent of the volume of each vial was left empty to provide an air cover for each sample and to thereby simulate conditions of storage and transit. The vials were sealed with screw caps and maintained at 100° F. during the test period. The results of these tests are given below in Table V.

Table V

| Inhibitor | Amount of Inhibitor Used (Weight Percent) | Duration of Test, days | Amount of Soluble Polymer Formed (Weight Percent) |
| --- | --- | --- | --- |
| Phenosafranin | 0.1 | 21 | 0.38 |
| Methylene Violet | 0.1 | 21 | 0.30 |
| Safranin | 0.1 | 21 | 0.19 |
| Induline 3B | 0.1 | 21 | 0.60 |
| Control | (No inhibitor) | 21 | 22.25 |

The data in Table V shows that only a very small amount of soluble polymer was formed in the 2-methyl-5-vinylpyridine under the conditions of the test. The amount of soluble polymer reported in Table V was determined by the hexane precipitation method, in which the polymer is precipitated out in n-hexane, filtered, dried and weighed.

EXAMPLE VI

Tests were made to determine the effectiveness of these azine dyes as inhibitors during the vacuum distillation of 2-methyl-5-vinylpyridine in a pilot plant column which was controlled so as to closely simulate commercial scale operations wherein the effluent from the dehydrogenation of 2-methyl-5-ethylpyridine is subjected to a steam and vacuum distillation. 2-Methyl-5-vinylpyridine, to which had been added 0.03 weight per cent of phenosafranin, was fed into the top of the column. The phenosafranin was added to 2-methyl-5-vinylpyridine in the column kettle, initially, to give a concentration of 0.3 weight per cent of phenosafranin, which concentration was maintained by proper adjustment of the overhead takeoff and the feed rate of the afore-described mixture of 2-methyl- 5-vinylpyridine and 0.03 weight per cent phenosafranin at the top of the column. The distillation was carried on for 10 hours at a pressure of 225 millimeters of mercury. To simulate the actual conditions in the plant where the effluent from the dehydrogenation of 2-methyl-5-ethyl-pyridine is distilled, about 4 weight per cent water was maintained in the kettle and, the temperatures of the kettle and overhead were 185° F. and 165 to 170° F., respectively. Samples were taken from the column kettle at 7, 8, 9 and 10 hour intervals and which were tested for polymer formation by the method described in Example I, i. e., a weighed sample was evaporated under vacuum and overboiling water. The residue which remained, with allowance for the weight of inhibitor present, was considered to be soluble polymer. The results of these runs and the samples tested are given below in Table VI.

Table VI

|  | Weight percent soluble polymer | | | |
| --- | --- | --- | --- | --- |
|  | 7 hours | 8 hours | 9 hours | 10 hours |
| Run A | 0.85 | 0.79 | 0.95 | 0.82 |
| Run B |  | 0.66 | 0.68 | 0.79 |

It is clear from these tests that these azine dyes are very effective to prevent polymer formation in a steam and vacuum distillation of a mixture of vinylpyridines such as is produced by the dehydrogenation of 2-methyl-5-ethylpyridine to produce 2-methyl-5-vinylpyridine.

The azine dyes each have their own characteristic color. It has been found, however, that color produced in the polymerizable materials by adding the dye is only the color of the dye itself and it has been found that this color and the azine dyes themselves can be easily and effectively removed from the vinyl-substituted pyridines by a simple flash distillation. As was indicated above, the vinylpyridines are useful as monomers in a variety of reactions and in many cases, it is desirable that the vinylpyridine be free of color. It is apparent that the azine dyes can be used to insure that the vinylpyridines are in a readily polymerizable form after processing and that by a simple flash distillation, the inhibitor and its color can be removed from the vinylpyridine.

When the azine dyes are used as inhibitors in the distillation of the effluent from the dehydrogenation of 2-methyl-5-ethylpyridine to produce 2-methyl-5-vinyl-pyridine, the inhibitors can be added to the feed to the distillation column, any point along the column or the inhibitors can be added to the reflux of the distillation column. It will be found that in some cases, a smaller amount of the inhibitor is effective when the inhibitor is added to the top of the column or to the column reflux.

It will be understood that the foregoing disclosure is illustrative of our invention and that other embodiments within the scope of the invention will occur to those skilled in the art. Those skilled in the art will appreciate, for instance, that for the purpose of this invention, vinyl-substituted heterocyclic compounds having a hetero nitrogen atom further substituted with non-interfering groups, for example, halo-, nitro-, amino-, hydroxyl-, and carboxyl-, are the same as non-substituted vinyl heterocyclic compounds having a hetero nitrogen atom.

We claim:

1. A method for inhibiting the polymerization of a heterocyclic nitrogen compound selected from the group consisting of compounds having the general formula

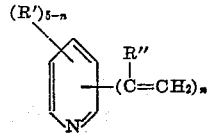 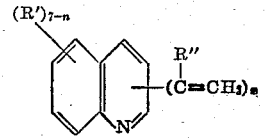 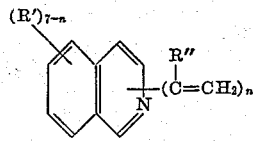

wherein $n$ is an integer selected from the group consisting of 1 and 2, each $R''$ is individually selected from the group consisting of H, $CH_3$ and $C_2H_5$, and each $R'$ is individually selected from the group consisting of H and an alkyl group, not more than 12 carbon atoms being present in the total of said $R'$ groups, which comprises adding to said heterocyclic compound a polymerization inhibiting amount of an inhibitor according to the formula

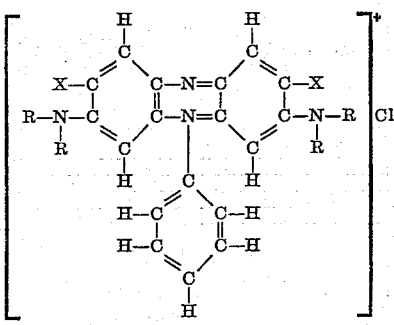

wherein R is a member selected from the group consisting of hydrogen, phenyl and alkyl radicals having up to 5 carbon atoms and X is a member selected from the group consisting of hydrogen, phenyl, alkyl radicals and $$-\underset{\underset{R}{|}}{N}-R$$

wherein said alkyl radicals and R are defined as hereinbefore stated.

2. A method according to claim 1 wherein said heterocyclic compound is a vinyl-substituted pyridine.

3. A method according to claim 1 wherein said heterocyclic compound is 2-methyl-5-vinylpyridine.

4. A method according to claim 1 wherein said inhibitor is phenosafranin.

5. A method according to claim 1 wherein said inhibitor is methylene violet.

6. A method according to claim 1 wherein said inhibitor is safranin.

7. A method according to claim 1 wherein said inhibitor is induline 3B.

8. A method according to claim 1 wherein said inhibitor is induline 6B.

9. A method for stabilizing a vinylpyridine against polymerization which comprises adding from 0.05 weight per cent to 2.0 weight per cent based on said vinylpyridine of an inhibitor according to the formula

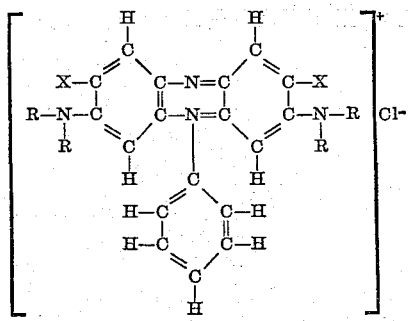

wherein R is a member selected from the group consisting of hydrogen, phenyl and alkyl radicals having up to 5 carbon atoms and X is a member selected from the group consisting of hydrogen, phenyl, alkyl radicals and $$-\underset{\underset{R}{|}}{N}-R$$

wherein said alkyl radicals and R are defined as hereinbefore stated.

10. A method according to claim 9 wherein the amount of said inhibitor is from 0.1 weight per cent to 1.0 weight per cent.

11. A method according to claim 10 wherein said inhibitor is phenosafranin.

12. A method according to claim 10 wherein said inhibitor is methylene violet.

13. A method according to claim 10 wherein said inhibitor is safranin.

14. A method according to claim 10 wherein said inhibitor is induline 3B.

15. A method according to claim 10 wherein said inhibitor is induline 6B.

16. In a process for preparing 2-methyl-5-vinylpyridine comprising the dehydrogenation of 2-methyl-5-ethylpyridine and the fractional distillation of the effluent from said dehydrogenation wherein said effluent is subjected to heat in the range from 180° to 220° F., a method for inhibiting polymerization of said effluent during said distillation which comprises adding to said effluent a polymerization inhibiting amount of an inhibitor according to the formula

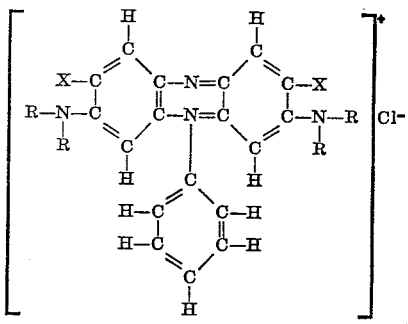

wherein R is a member selected from the group consisting of hydrogen, phenyl and alkyl radicals having up to 5 carbon atoms and X is a member selected from the group consisting of hydrogen, phenyl, alkyl radicals and

wherein said alkyl radicals and R are defined as hereinbefore stated.

17. A polymerizable heterocyclic base selected from the group consisting of compounds having the general formula

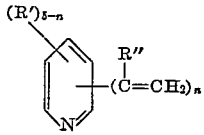 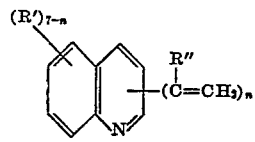 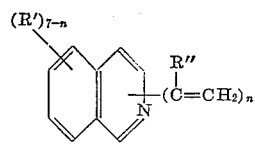

wherein $n$ is an integer selected from the group consisting of 1 and 2, each R″ is individually selected from the group consisting of H, $CH_3$ and $C_2H_5$, and each R′ is individually selected from the group consisting of H and an alkyl group, not more than 12 carbon atoms being present in the total of said R′ groups, said heterocyclic base being stabilized by the addition of a stabilizing amount of a compound selected from the group consisting of compounds according to the general formula

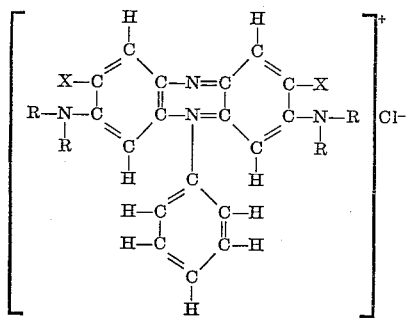

wherein R is a member selected from the group consisting of hydrogen, phenyl and alkyl radicals having up to 5 carbon atoms and X is a member selected from the group consisting of hydrogen, phenyl, alkyl radicals and

wherein said alkyl radicals and R are defined as hereinbefore stated.

18. A composition of matter in accordance with claim 17 wherein said inhibitor is phenosafranin.

19. A composition of matter in accordance with claim 17 wherein said inhibitor is methylene violet.

20. A composition of matter in accordance with claim 17 wherein said inhibitor is safranin.

21. A composition of matter in accordance with claim 17 wherein said inhibitor is induline 3B.

22. A composition of matter in accordance with claim 17 wherein said inhibitor is induline 6B.

References Cited in the file of this patent

UNITED STATES PATENTS 2,556,845     Kauffman _____ June 12, 1951

OTHER REFERENCES

Dunbrook et al.: Official Gazette, vol. 644, pp. 623–4.
Frank et al.: J. Am. Chem. Soc., vol. 68, p. 908 (1946).
Rac: Chem. Abst., vol. 40, cols. 4895–6 (1946).